(12) United States Patent
He et al.

(10) Patent No.: US 7,349,179 B1
(45) Date of Patent: Mar. 25, 2008

(54) WRITE HEAD FOR IMPROVED MANUFACTURABILITY LARGER WRITE FIELD AND REDUCED ADJACENT TRACK ERASURE

(75) Inventors: Qing He, Fremont, CA (US); David John Seagle, Morgan Hill, CA (US); Loi Dac Pham, Fremont, CA (US); Marcos Moises Lederman, San Francisco, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 1274 days.

(21) Appl. No.: 09/907,152

(22) Filed: Jul. 16, 2001

(51) Int. Cl.
*G11B 5/127* (2006.01)
(52) U.S. Cl. ................................... 360/126
(58) Field of Classification Search .................. 360/126
See application file for complete search history.

(56) References Cited

U.S. PATENT DOCUMENTS

| | | | |
|---|---|---|---|
| 5,802,700 A * | 9/1998 | Chen et al. ............... | 29/603.14 |
| 5,805,391 A | 9/1998 | Chang et al. ............... | 360/317 |
| 5,935,644 A * | 8/1999 | Heim et al. ............... | 427/116 |
| 6,029,339 A | 2/2000 | Chang et al. ............. | 29/603.14 |
| 6,130,809 A | 10/2000 | Santini ....................... | 360/317 |
| 6,172,848 B1 * | 1/2001 | Santini ....................... | 360/126 |
| 6,301,085 B1 * | 10/2001 | Sato ............................ | 360/317 |
| 6,414,824 B1 * | 7/2002 | Sasaki ........................ | 360/317 |
| 6,459,543 B1 * | 10/2002 | Sasaki ........................ | 360/126 |

OTHER PUBLICATIONS

Kawabe et al.,"Fabrication of Thin Film Inductive Head with Top Core Separated Structure", IEEE Transactions on Magnetics, vol. 27, No. 6, Nov. 1991, pp. 4936-4938.

\* cited by examiner

*Primary Examiner*—A. J. Heinz
*Assistant Examiner*—Mark Blouin
(74) *Attorney, Agent, or Firm*—Jonathan E. Prejean, Esq.; Strategic Patent Group

(57) ABSTRACT

A magnetic write head provides a significant write field and minimal adjacent track erasure, and lends itself to improved manufacturability. The write head includes a pedestal throat height that defines a bottom pole, P1, and that is substantially recessed from the air bearing surface. The write head further includes a top pole, P2, that defines a nose that is closer to the air bearing surface than the pedestal zero throat. This design achieves a relatively high ratio of the off-track to on-track field. As an example, a 1:4 ratio could be achieved to significantly mitigate the erasure problem of the adjacent tracks resulting from magnetic flux saturation.

30 Claims, 11 Drawing Sheets

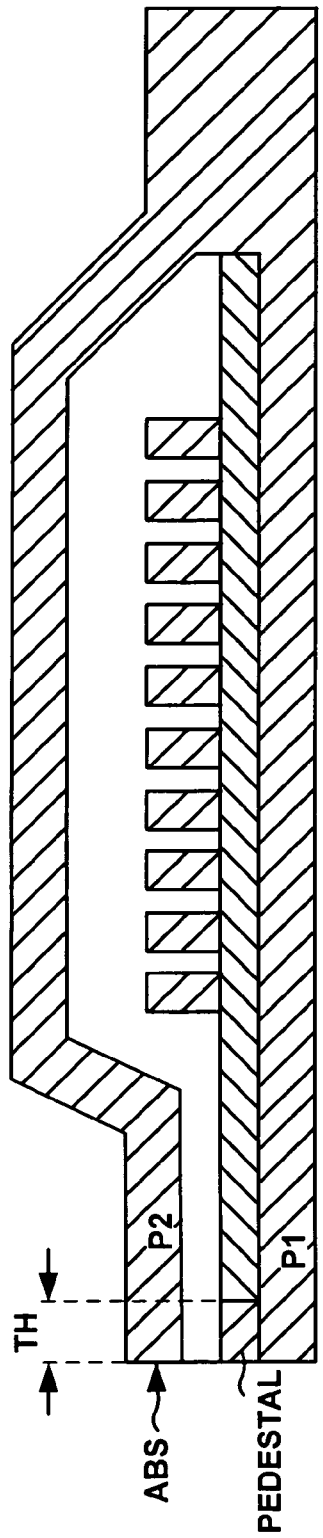
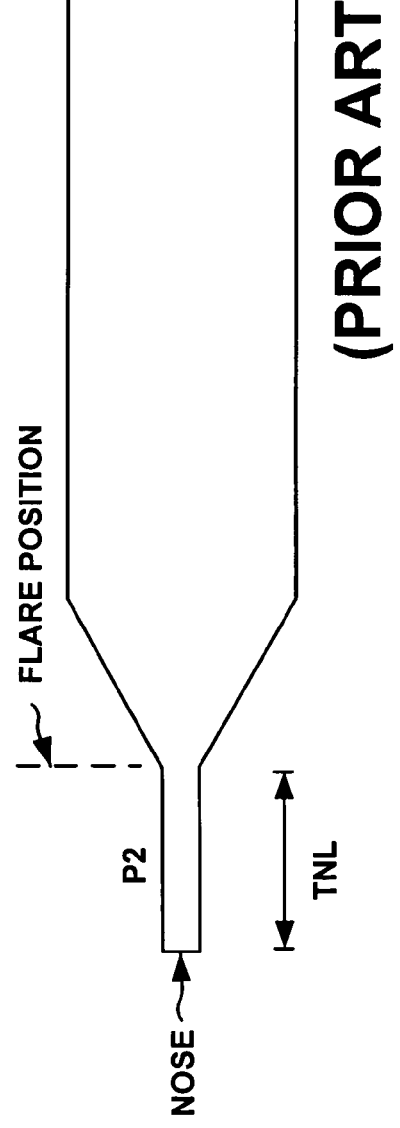
FIG. 1A (PRIOR ART)
FIG. 1B (PRIOR ART)

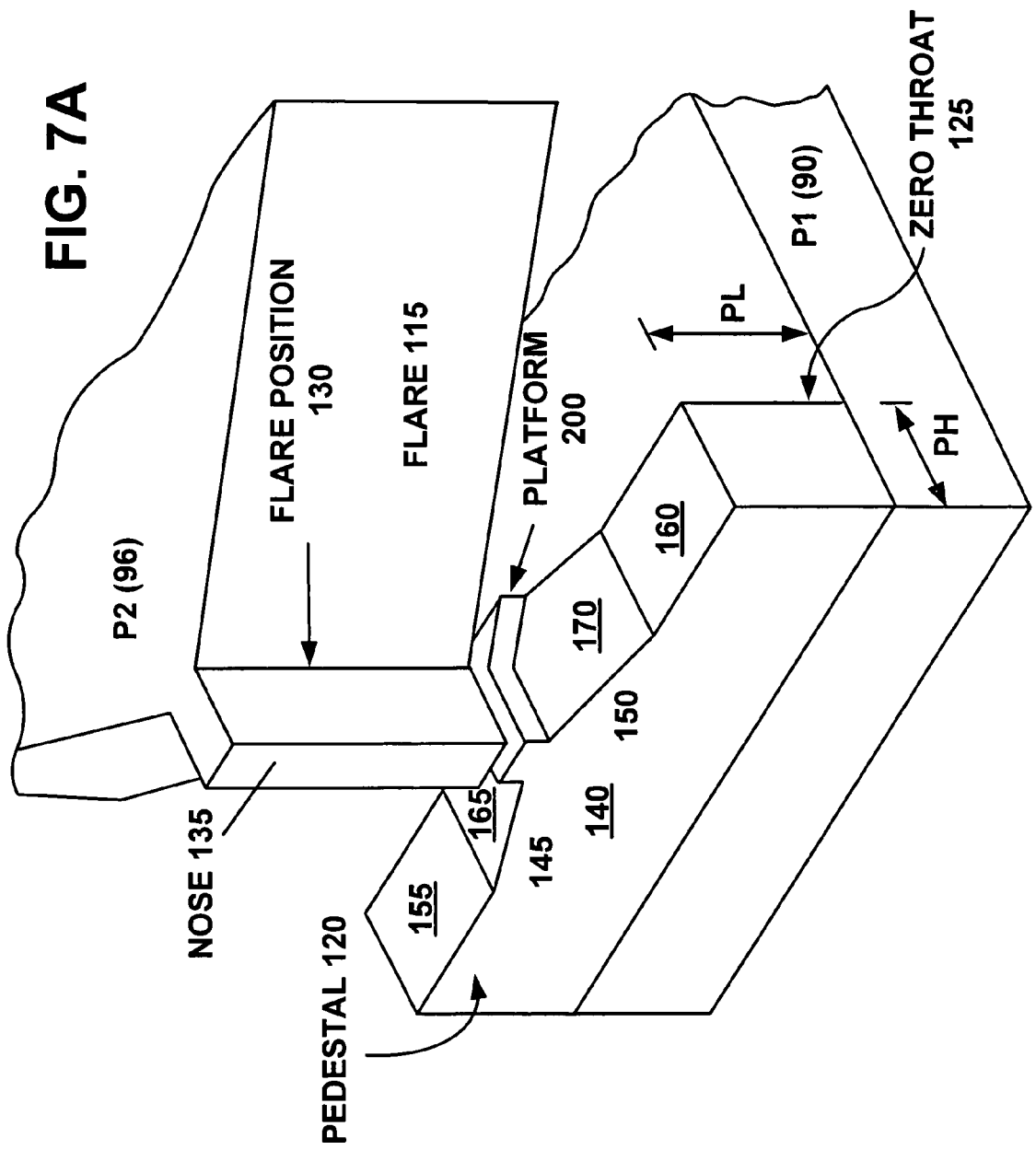

WRITE HEAD FOR IMPROVED MANUFACTURABILITY LARGER WRITE FIELD AND REDUCED ADJACENT TRACK ERASURE

FIELD OF THE INVENTION

The present invention relates in general to data storage systems such as disk drives, and it particularly relates to a thin film read/write head for use in such data storage systems. More specifically, the present invention relates to an enhanced design of a thin film, inductive type write head, also known as Pedestal Defined Zero Throat (PDZT) write head, with a substantial recession of the pedestal point (throat height) away from the air bearing surface (ABS) and a substantial extension of the top-pole flare point or nose toward the ABS.

BACKGROUND OF THE INVENTION

In a conventional magnetic storage system, a thin film magnetic head includes an inductive read/write element mounted on a slider. The magnetic head is coupled to a rotary actuator magnet and a voice coil assembly by a suspension and an actuator arm positioned over a surface of a spinning magnetic disk. In operation, a lift force is generated by the aerodynamic interaction between the magnetic head and the spinning magnetic disk. The lift force is opposed by equal and opposite spring forces applied by the suspension such that a predetermined flying height is maintained over a full radial stroke of the rotary actuator assembly above the surface of the spinning magnetic disk.

An exemplary magnetic head is illustrated in FIGS. 1A, 1B, 2A, and 2B, and includes a thin film write head with a bottom pole (P1) and a top pole (P2). The bottom pole P1 presents a pole tip height (also referred to as pole tip length) dimension commonly referred to as throat height ("TH"). In a finished write head, the throat height is measured between an air bearing surface ("ABS"), formed by lapping and polishing the pole tip, and a zero throat ("ZT") level where the pole tip of the write head transitions to a back region.

The pole tip region is defined as the region between the ABS and the zero throat level. This pole tip region is also known as a pedestal, which is an extension of the bottom pole P1.

Similarly, the top pole P2 has a pole tip height dimension commonly referred to as "nose length". Typically in a conventional design, the nose length ranges from 1.5 to 3 μm. In a finished write head, the nose is defined as the region of the top pole P2 between the ABS and a "flare position" where the pole tip transitions to a back region.

Each of the bottom pole P1 and top pole P2 has a pole tip located in its respective pole tip region. The tip regions of the poles P1 and P2 are separated by a magnetic write (or recording) gap, which is a thin layer of nonmagnetic material. In a conventional design, the nose of the top pole P2 typically extends to an aft position relative to the throat height from the ABS, which ranges from 0.5 to 1.5 μm. Whereas the width of the pole tip of the top pole P2 is defined by the track width of a typical magnetic storage medium, the width of the pedestal region can span several tracks.

The current trend in magnetic storage industries has been toward a high track density design of magnetic storage media. This increase in track density enables a larger storage capacity than that of the prior design. In order to maintain the industry standard interface, magnetic storage devices increasingly rely on reducing track width as a means to increase the track density without significantly altering the geometry of the storage media.

A significant concern with the current design of magnetic write heads is the ability to write digital data to the target track without adversely affecting the data quality of the adjacent tracks that are in close proximity due to the high track density design of the magnetic storage media.

This task has been particularly difficult to accomplish with the current magnetic write head design. In particular, during a write operation, significant magnetic flux leakage from the top pole P2 enters the bottom pole P1 through the pedestal region, thereby causing a magnetic saturation in the pedestal. This flux leakage is a consequence of the longer nose of the top pole P2 relative to the throat height of the bottom pole P1.

With further reference to FIGS. 2A and 2B, the magnetic saturation in the pedestal region concentrates predominantly in sloped areas of the pedestal referred to as E1 and E2, that are positioned on either side of a platform of the pedestal and parallel to the ABS.

Since areas E1 and E2 cover a number of data tracks contiguous to a target track, there is a tendency for the data in these adjacent tracks to be disturbed by the magnetic flux saturation in the surrounding region. In some instances, up to 6 adjacent tracks on either side of the target track can be adversely affected. In a worst case scenario, the data disturbances can result in a total erasure of data in the adjacent tracks after several repetitive write operations.

The ratio of the adjacent or off-track field to the target or on-track field in this instance is approximately about 1:3 for a typical conventional magnetic write head design. It would therefore be desirable for this ratio to be increased in order to minimize the magnetic flux saturation in the adjacent tracks.

SUMMARY OF THE INVENTION

It is a feature of the present invention to provide a magnetic write head architecture for a larger write field and less adjacent track erasure than a conventional write head design. The simplicity in the present architecture lends itself to improved manufacturability, while effectively reducing the magnetic flux saturation problem.

Among other new features, the present write head architecture incorporates the following two novel design elements:

1. The pedestal point or throat height of the bottom pole P1 is substantially recessed from the ABS; and
2. The nose length of the top pole P2 is substantially reduced so as to cause the flare point of the top pole P2 to move closer to the ABS.

In order to achieve these two design features, a new geometry of the pedestal region is conceived for the new write head architecture of the present invention, to achieve a relatively high ratio of the off-track to on-track field. Specifically, a desirable ratio of 1:4 is possible with this design, thereby significantly mitigating the erasure problem of the adjacent tracks resulting from magnetic flux saturation.

BRIEF DESCRIPTION OF THE DRAWINGS

The features of the present invention and the manner of attaining them, will become apparent, and the invention itself will be understood by reference to the following description and the accompanying drawings, wherein:

FIG. 1A is a cross-sectional, side elevational view of a conventional write head;

FIG. 1B is top plan view of the write head of FIG. 1A;

FIG. 7A is an enlarged, partial, perspective view of a pedestal region and a pole tip regions of a bottom pole P1 and top pole P2 of the write head of FIGS. 5, 6A, and 6B;

Similar numerals in the drawings refer to similar elements. It should be understood that the sizes of the different components in the figures might not be in exact proportion, and are shown for visual clarity and for the purpose of explanation.

DETAILED DESCRIPTION OF THE PREFERRED EMBODIMENTS

Figure 3:
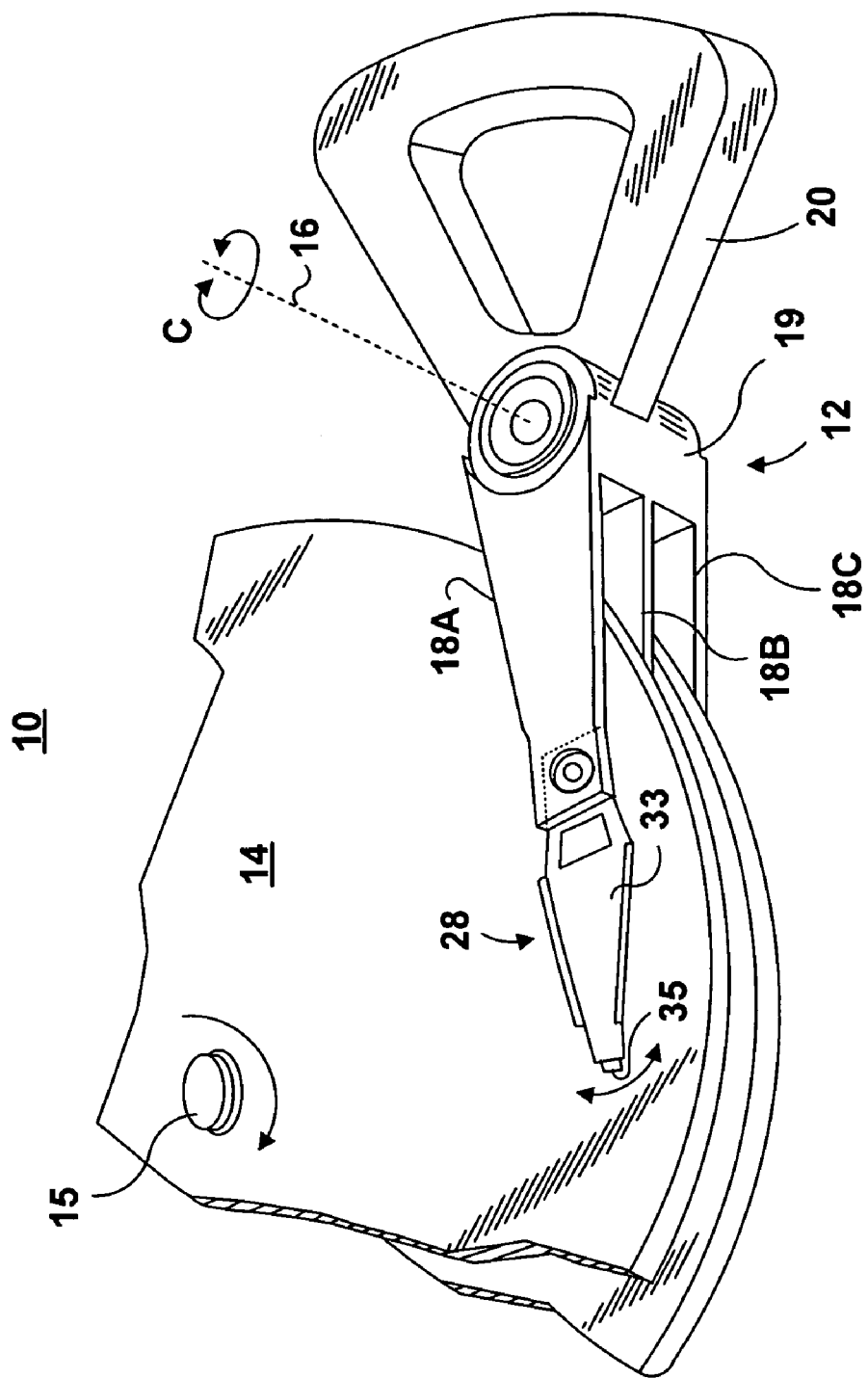
FIG. 3 is a fragmentary perspective view of a data storage system utilizing a read/write head according to the present invention.

FIGS. 3 through 8 illustrate the main features of the present invention. FIG. 3 illustrates a disk drive 10 comprised of a head stack assembly 12 and a stack of spaced apart magnetic data storage disks or media 14 that are rotatable about a common shaft 15. The head stack assembly 12 is rotatable about an actuator axis 16 in the direction of the arrow C. The head stack assembly 12 includes a number of actuator arms, only three of which 18A, 18B, 18C are illustrated, which extend into spacings between the disks 14.

The head stack assembly 12 further includes an E-shaped block 19 and a magnetic rotor 20 attached to the block 19 in a position diametrically opposite to the actuator arms 18A, 18B, 18C. The rotor 20 cooperates with a stator (not shown) for rotating in an arc about the actuator axis 16. Energizing a coil of the rotor 20 with a direct current in one polarity or the reverse polarity causes the head stack assembly 12, including the actuator arms 18A, 18B, 18C, to rotate about the actuator axis 16 in a direction substantially radial to the disks 14.

Figure 4:
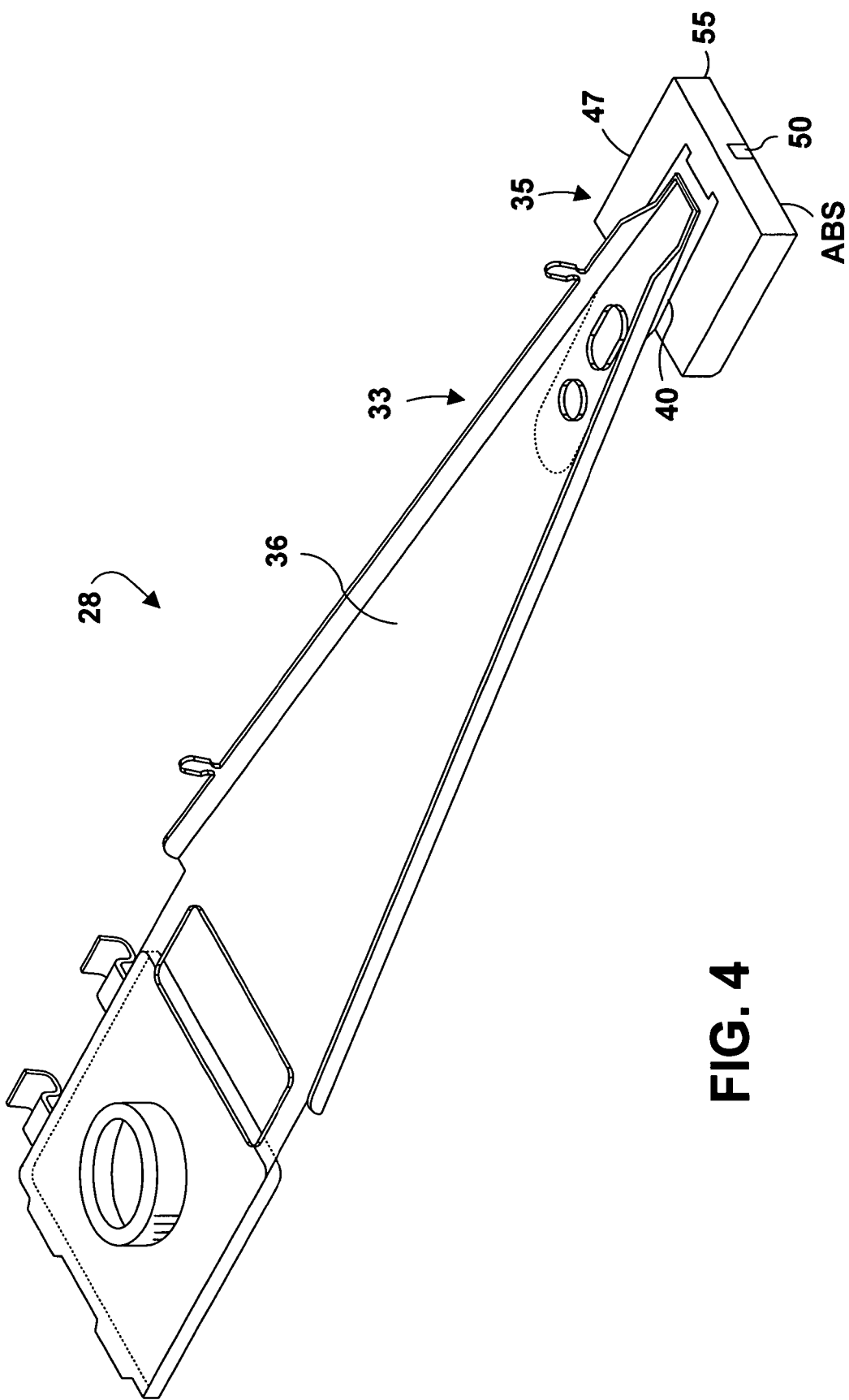
FIG. 4 is a perspective view of a head gimbal assembly comprised of a suspension, and a slider to which the read/write head of FIG. 3 is secured, for use in a head stack assembly.

A head gimbal assembly (HGA) 28 is secured to each of the actuator arms, for instance 18A. With reference to FIG. 4, the HGA 28 is comprised of a suspension 33 and a read/write head 35. The suspension 33 includes a resilient load beam 36 and a flexure 40 to which the head 35 is secured.

The head 35 is formed of a slider 47 secured to the free end of the load beam 36 by means of the flexure 40, and a read/write element 50 supported by the slider 47. The slider 47 can be any conventional or available slider.

In the exemplary embodiment of FIG. 4, the read/write element 50 is mounted at the trailing edge 55 of the slider 47 so that its forwardmost tip is generally flush with the ABS of the slider 47. In another embodiment according to the present invention more than one read/write element 50 can be secured to the trailing edge 55 or other side(s) of the slider 47.

Figure 5:
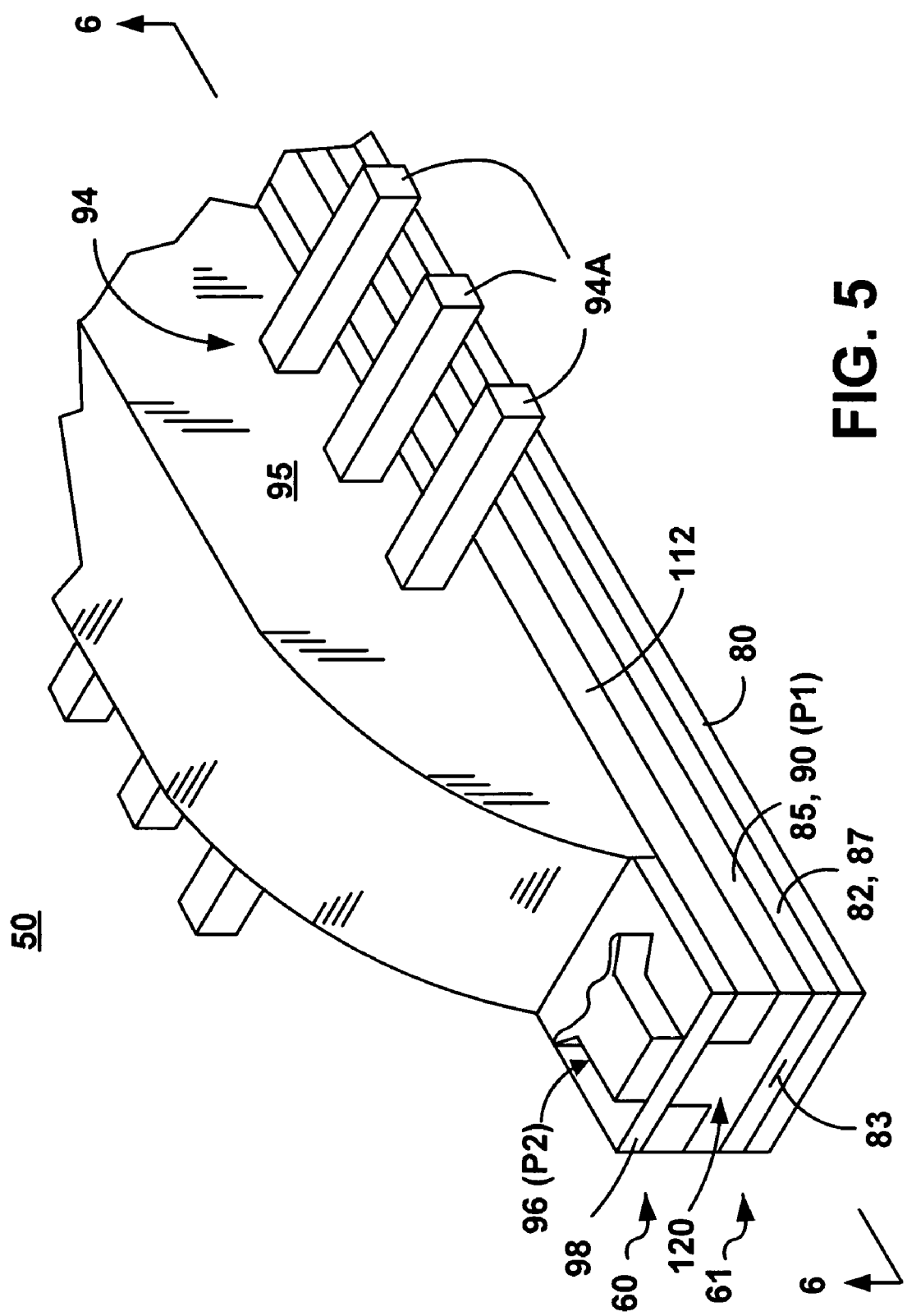
FIG. 5 is an enlarged perspective view of a thin film read/write element, forming part of the read/write head of FIGS. 3 and 4, and made according to the present invention.

With reference to FIG. 5, the read/write element 50 integrates a write section 60 and a read section 61. The read section 61 is formed of a first shield layer (Shield 1) 80 preferably made of a material that is both magnetically soft and thermally conductive. An insulating layer 82 is formed over substantially the entire surface of the first shield layer 80 to define a non-magnetic, transducing read gap 87. The read section 61 is also comprised of a read sensor 83 formed within the insulation layer 82. The read sensor 83 can be any suitable sensor, including but not limited to a magnetoresistive (MR) element, a giant magnetoresistive (GMR) element, a spin valve, or a Current In the Plane mode (CIP) sensor.

The read section 61 is also comprised of a second shield layer (Shield 2) 85 that is made of a magnetically soft and thermally conductive material, which may be similar or equivalent to that of the first shield layer 80. The second shield layer 85 is formed over substantially the entire surface of the insulating layer 82.

The write head 60 is comprised of a first pole layer or bottom pole P1 (also referenced by the numeral 90) that extends from the ABS to a back gap 91 behind the last turn 92 of a write coil 94. The bottom pole P1 or 90 is made of magnetically soft material, and may be for example purpose only, similar or equivalent to that of the first shield layer 80. In the exemplary embodiment of FIG. 5, the second shield layer 85 and the first pole layer P1, 90 are illustrated as being the same layer. It should however be clear that according to another embodiment of the present invention, the second shield layer 85 and the first pole layer P1, 90 can be independently formed and separated by an insulation layer therebetween.

With further reference to FIGS. 6A, 6B, and 7A through 7E, a pedestal 120 is formed on the first pole layer 90, from the ABS to a back face 125 that defines a zero throat level with extreme accuracy. The pedestal 120 is surrounded by a pedestal region. The zero throat level lies in a well defined plane that is generally parallel to the plane of the ABS, which in turn is co-planar with the forward face 140 of the pedestal 120. In a preferred embodiment, the pedestal 120 extends only to the zero throat 125 with a pedestal height ("ph") ranging from approximately 1.55 to approximately 3 μm. The pedestal height is also referred to herein as "the throat height."

The write coil 94 includes a plurality of multi-turn conductive coil elements (or conductors) 94A, only a few of which are illustrated also form part of the write section 60. The coil elements 94A are formed within an insulating layer 95. The write coil 94 can have two, four or more turns as required, typically 6 to 12 turns, to generate the desired write field. According to another embodiment of the present invention, the write coil 94 may have a multi-layer design, with typically 1, 2, or more layers.

A second pole layer or top pole P2 (also referenced by the numeral 96) is made of a magnetically soft material that can be similar or equivalent to that of the first shield layer 80 and the first pole layer 85. The second pole layer 96 is formed over, and is separated from the pedestal 120, to define a write gap 98 therewith. The thickness of the second pole layer 96 can be substantially the same as, or similar to that of the first shield layer 80. The write gap 98 can be filled with a material similar or equivalent to that of the insulating layer 82.

With further reference to FIG. 5, a write circuit (not shown) is connected to the write coil 94, and, during a write mode, it sends an electrical current $I_W$ to induce a flux flow through the write gap 98. Changes in the flux flow across the write gap 98 produce the alternating magnetic orientations of magnetized regions or domains in the disk 14 during a write operation.

Figure 6A:
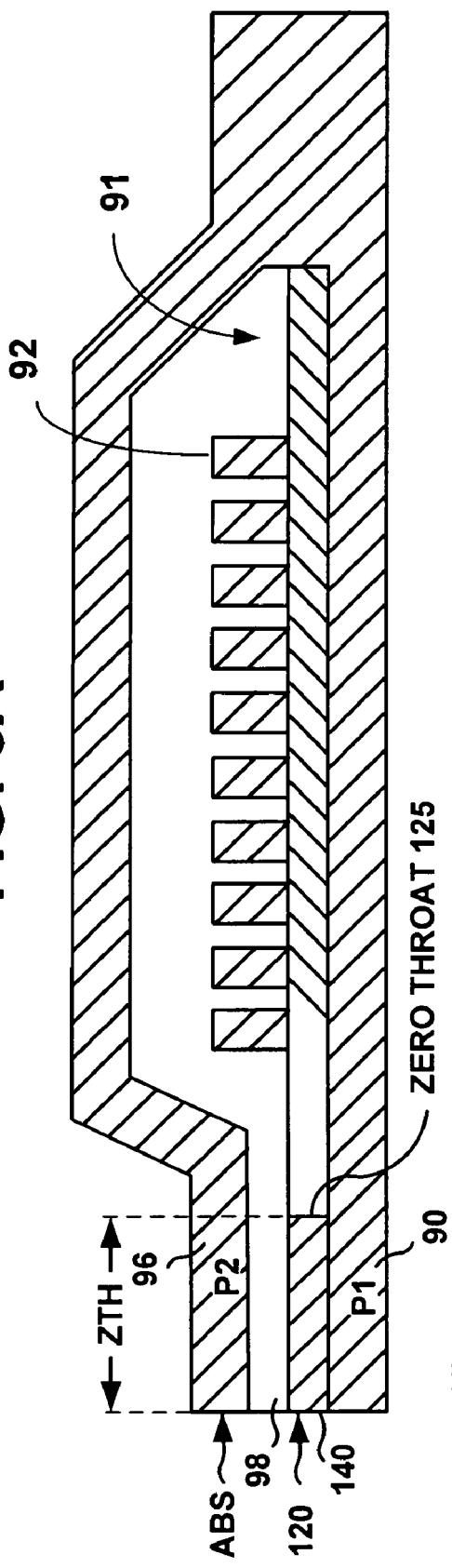
FIG. 6A is a cross-sectional view of the write head of FIG. 5, with the read element not shown, taken along line 6-6.
Figure 6B:
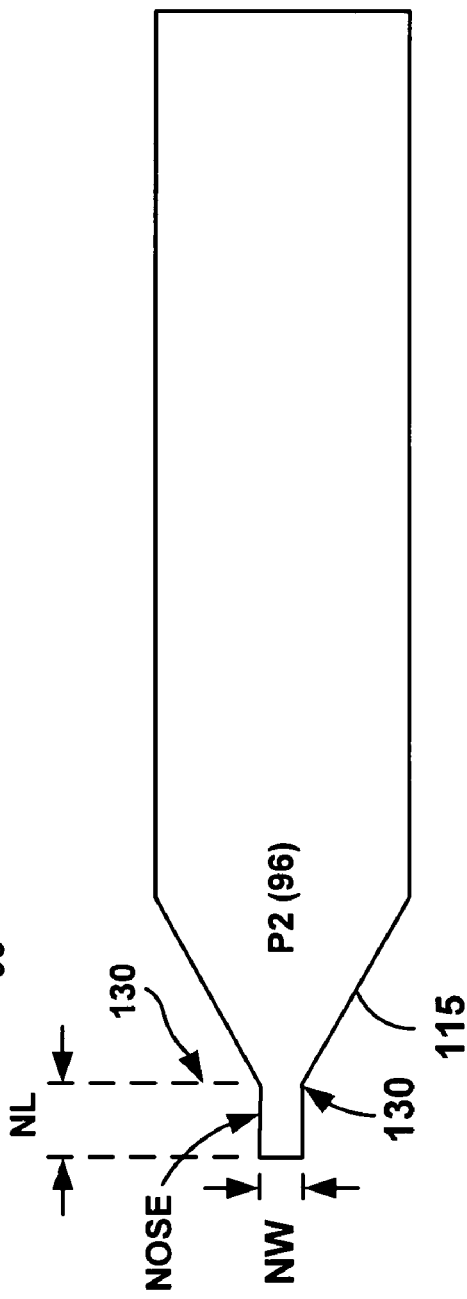
FIG. 6B is top plan view of the write head of FIG. 6A.
Figure 7B:
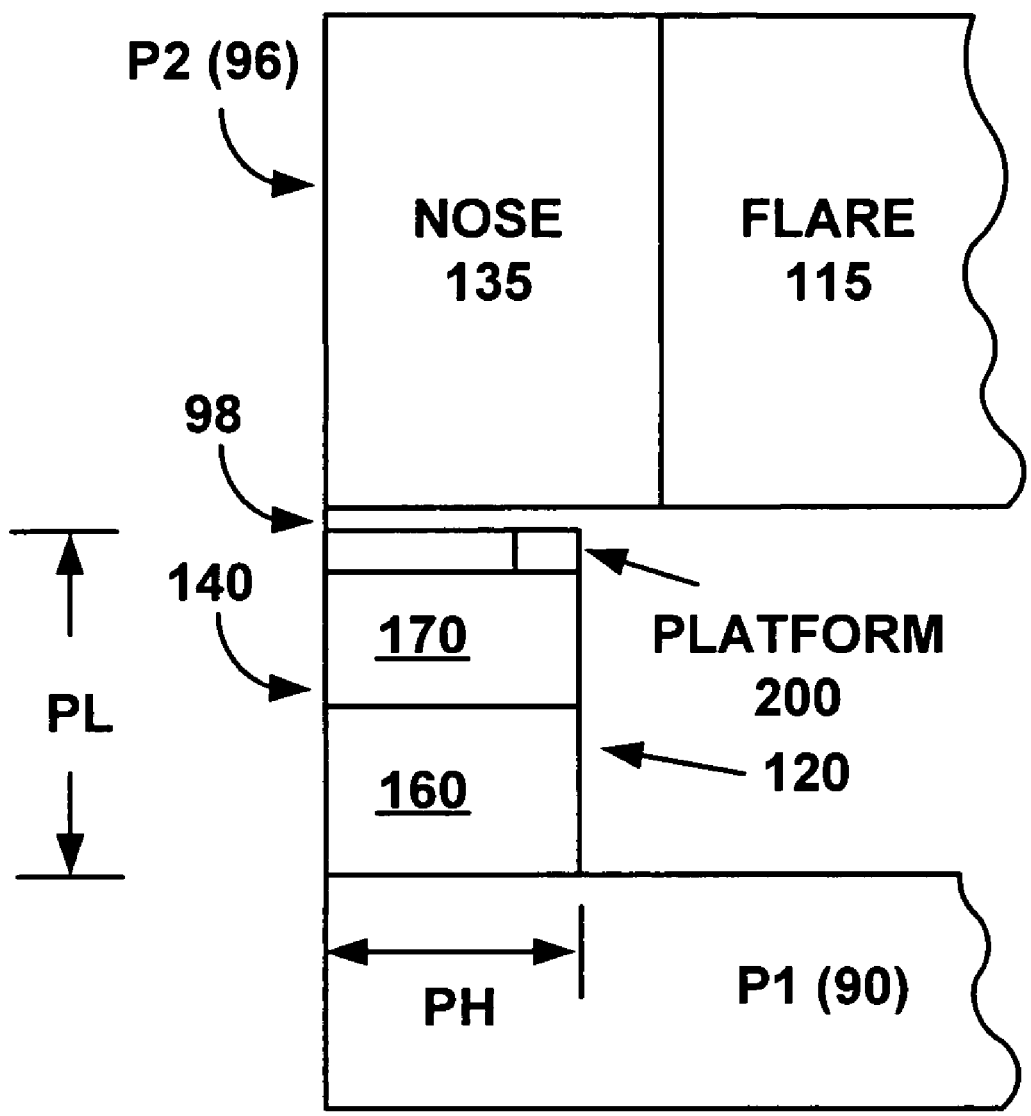
FIG. 7B is a side elevational view of the pedestal and pole tip regions of FIG. 7A.
Figure 7C:
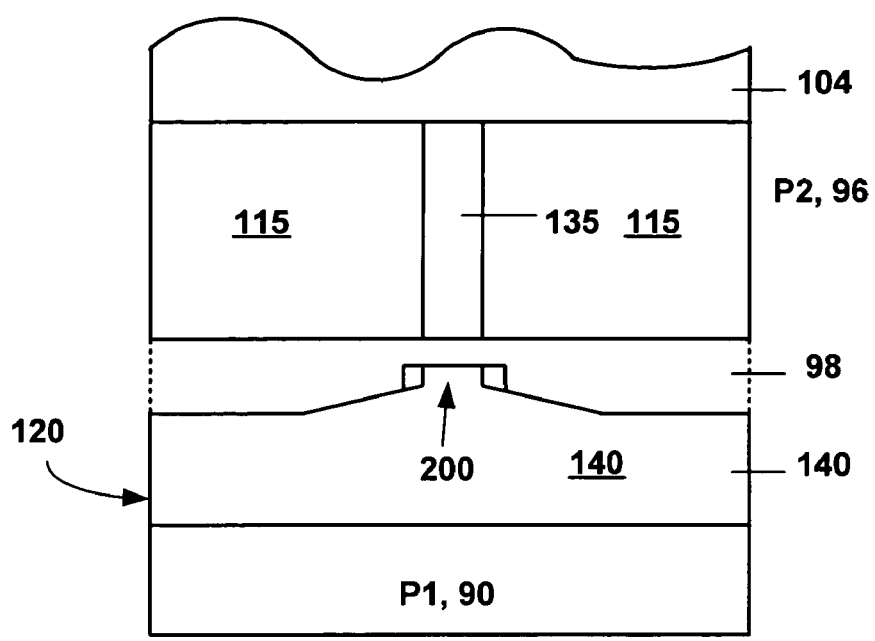
FIG. 7C is a front view of the pedestal and pole tip regions of FIGS. 7A and 7B.
Figure 7D:
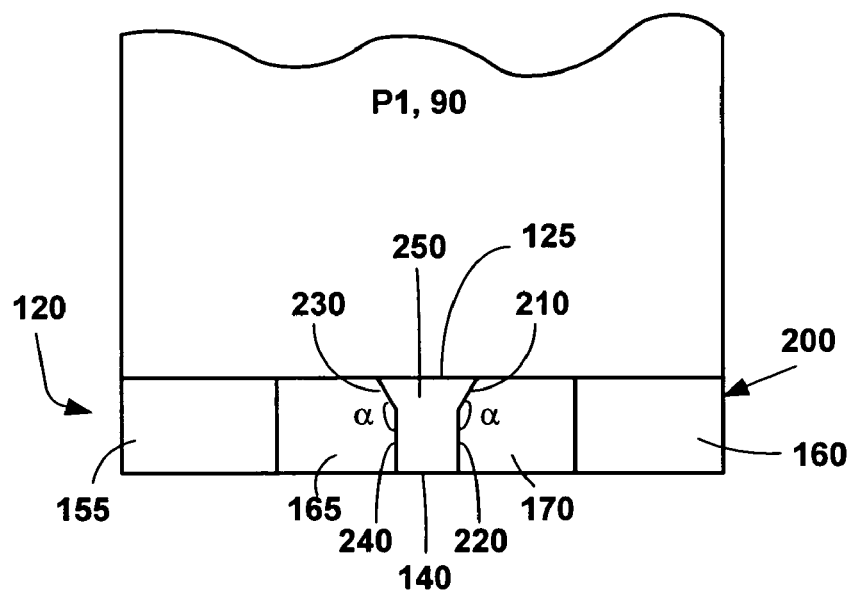
FIG. 7D is a top plan view of the pedestal region of the bottom pole P1.

With reference to FIG. 6B, the second pole layer 96 includes an angled (or sloped) back edge or flare 115 along which the second pole layer 96 is connected to a top (or upper) yoke 104 (FIG. 7C). The portion of the second pole layer 96 from the ABS to a forwardmost edge 130 of the flare 115 is referred to as a nose 135. The forwardmost edge 130 is also known as the flare position.

In a preferred embodiment, the nose length ("NL") typically ranges between approximately 0.6 and approximately 1.3 μm. The width of the nose ("nw") is preferably made to be precisely equal to the desired track width. One feature of the present invention is that the nose length NL is shorter than the length of the nose in the conventional design of FIG. 1B.

According to the present invention, the nose length NL is approximately less than half the zero throat height ("ZTH") also referred to as zero pedestal height, where in a finished write head, the zero throat height is measured between the ABS and the back face 125 that defines the zero throat level. This relationship can be expressed by the following equation:

$$\frac{NL}{ZTH} < 1/2.$$

Referring to the conventional design illustrated in FIGS. 1A and 1B, the typical nose length ("TNL") is more than the length of the throat height TH of the pedestal. This relationship can be expressed by the following equation:

$$\frac{TNL}{TH} > 1/2.$$

It is this change in ratio that simultaneously allows for an increased on-track field, and a reduced adjacent-track field.

Another important feature of the present invention is that the zero throat 125 of the pedestal 120 is substantially made distally farther from the ABS than that of the conventional design illustrated in FIGS. 1A and 1B. This feature is significant in that while increasing the zero throat height ZTH could cause a reduction in both the off-track and on-track fields, moving the flare position 130 closer to the ABS substantially improves the on-track field that more than adequately compensates for the reduced on-track field from the increased zero throat height, without affecting the reduced off-track field. With this arrangement, a ratio of off-track to on-track field of 1:4 can thus be attained, effectuating a significant reduction in the magnetic flux saturation problem that could otherwise result in incidental erasure or loss of data in the adjacent tracks.

Figure 2A:
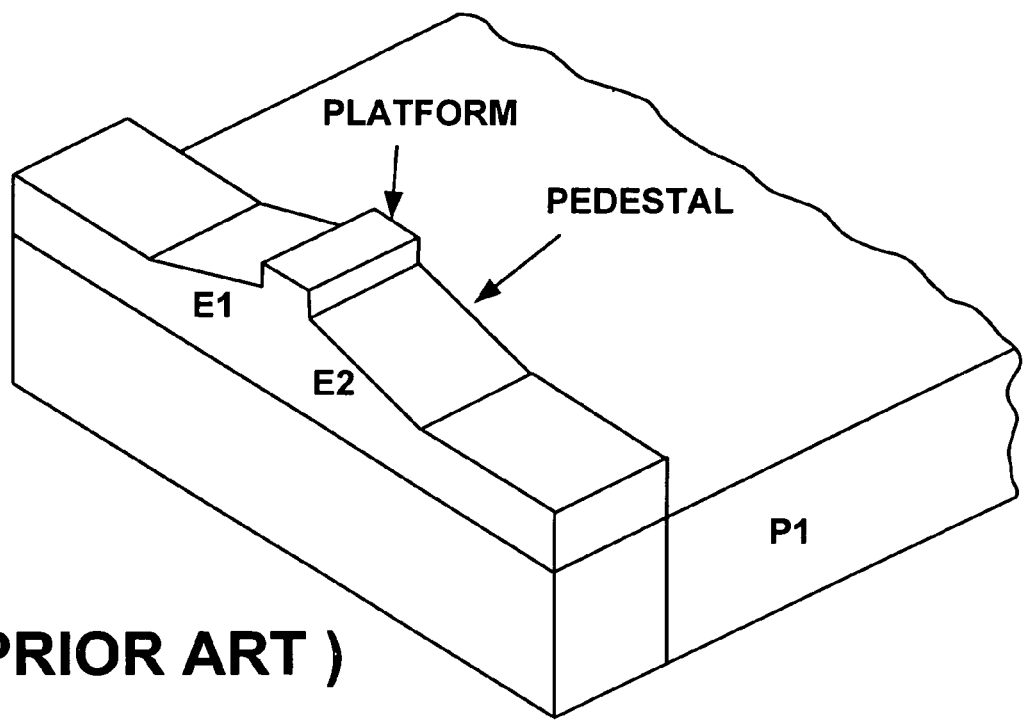
FIG. 2A is an enlarged, partial, perspective view of a pedestal region of the write head of FIGS. 1A and 1B.
Figure 2B:
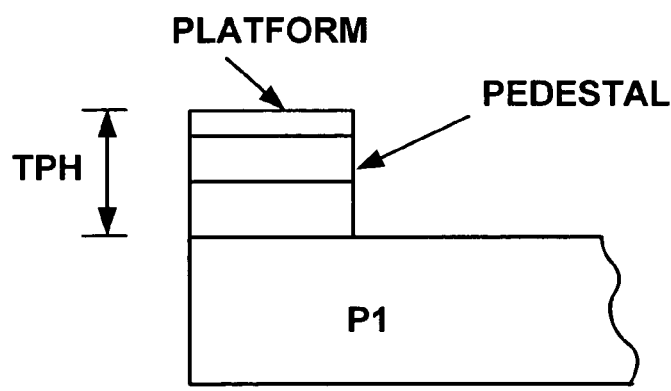
FIG. 2B is a side elevational view of the pedestal region of FIG. 2A.

Referring now to FIGS. 7A, 7B, 7C, 7D, and 7E, the pedestal 120 is formed as a multi-faceted block situated on top of the first pole layer 90. The height of the pedestal 120 ("PH") is substantially greater than the typical pedestal height ("TPH") of the conventional design of FIGS. 2A and 2B. This feature moves the back of the pedestal 120 farther from the ABS, for allowing the magnetic saturation region to help reduce the magnetic flux leakage entering from the second pole layer 96.

The upper facet or surface pedestal 120 includes two similar, rectangular, flat faces 155, 160 that are generally parallel to the first pole layer 90. Each of these flat faces 155, 160 extends integrally into a corresponding upwardly sloping faces 165, 170. In the embodiment illustrated in FIGS. 7A through 7E and 8, the flat face 155 extends into the sloping face 165, while the flat face 160 extends into the sloping face 170.

The two sloping faces 165, 170 extend into a raised platform 200 that is specially shaped according to the present invention. The platform 200 is peripherally bounded by the forward face 140; two vertical side walls 210, 240 (FIG. 7D) that extend into two angled side walls 220, 230, respectively; a top face 250; and the back face 125.

The forward face 140 is typically coplanar with the ABS and is generally parallel to the back face 125. The top face 250 is flat, and lies in a plane that is normal to the ABS.

The two vertical side walls 210, 240 are generally similar in shape. Each of the two vertical side walls 210 and 240 lies in a plane that is normal to the ABS and to the top face 250. The side wall 210 extends integrally into the angled side wall 220, and forms an angle α therewith. Similarly, the side wall 240 extends integrally into the angle side wall 230 and forms an angle α therewith. The angle α can range between approximately 10 to 45 degrees. In a preferred embodiment, the angle α is approximately 35 degrees. The height ("ph") of the platform 200 (FIG. 7E), that is the height of the side wall 210 can range between approximately 0.15 μm and approximately 0.45 μm.

The platform 200 is generally coaligned with the nose 135, so that the width ("pw") of the platform 200 corresponds to the width ("nw") of the nose 135 and also to the desired track width.

Figure 7E:
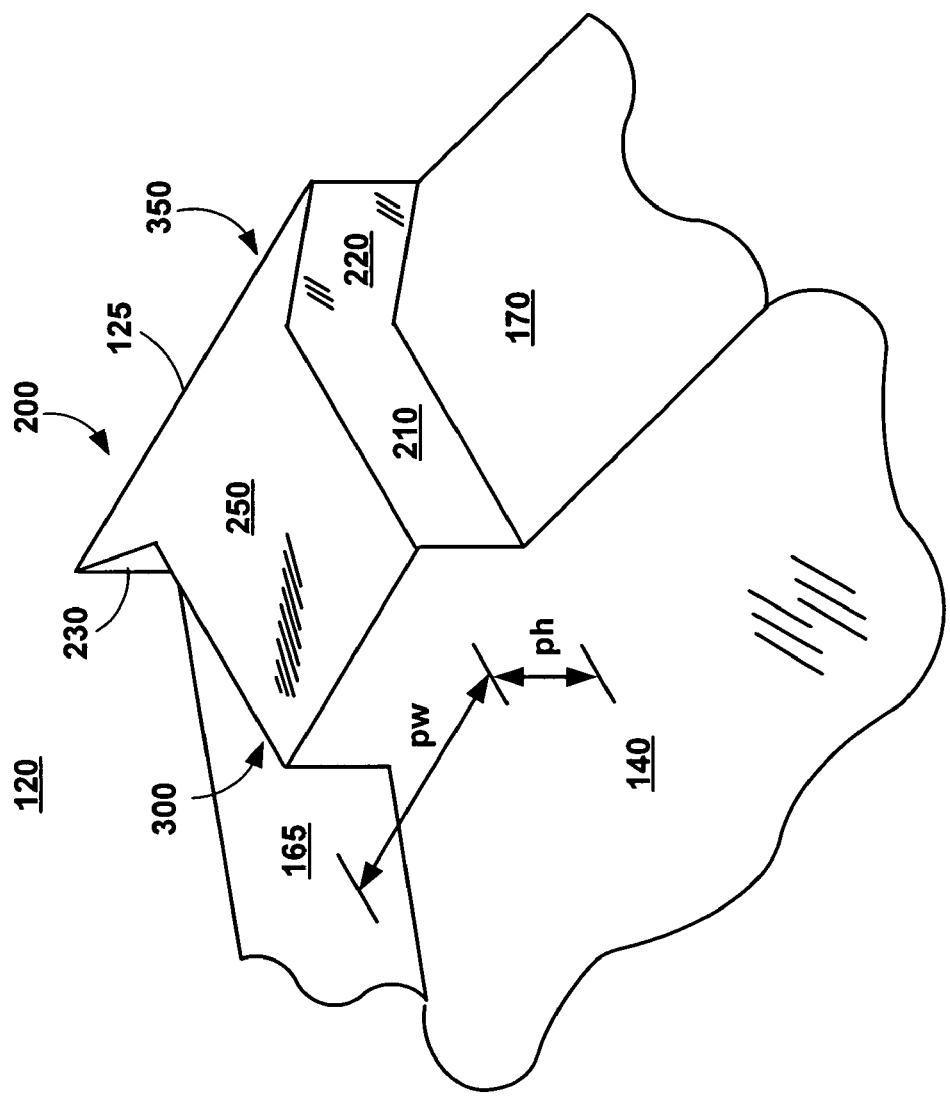
FIG. 7E is an enlarged, partial, perspective view of the pedestal region of FIGS. 7A through 7D.
Figure 8:
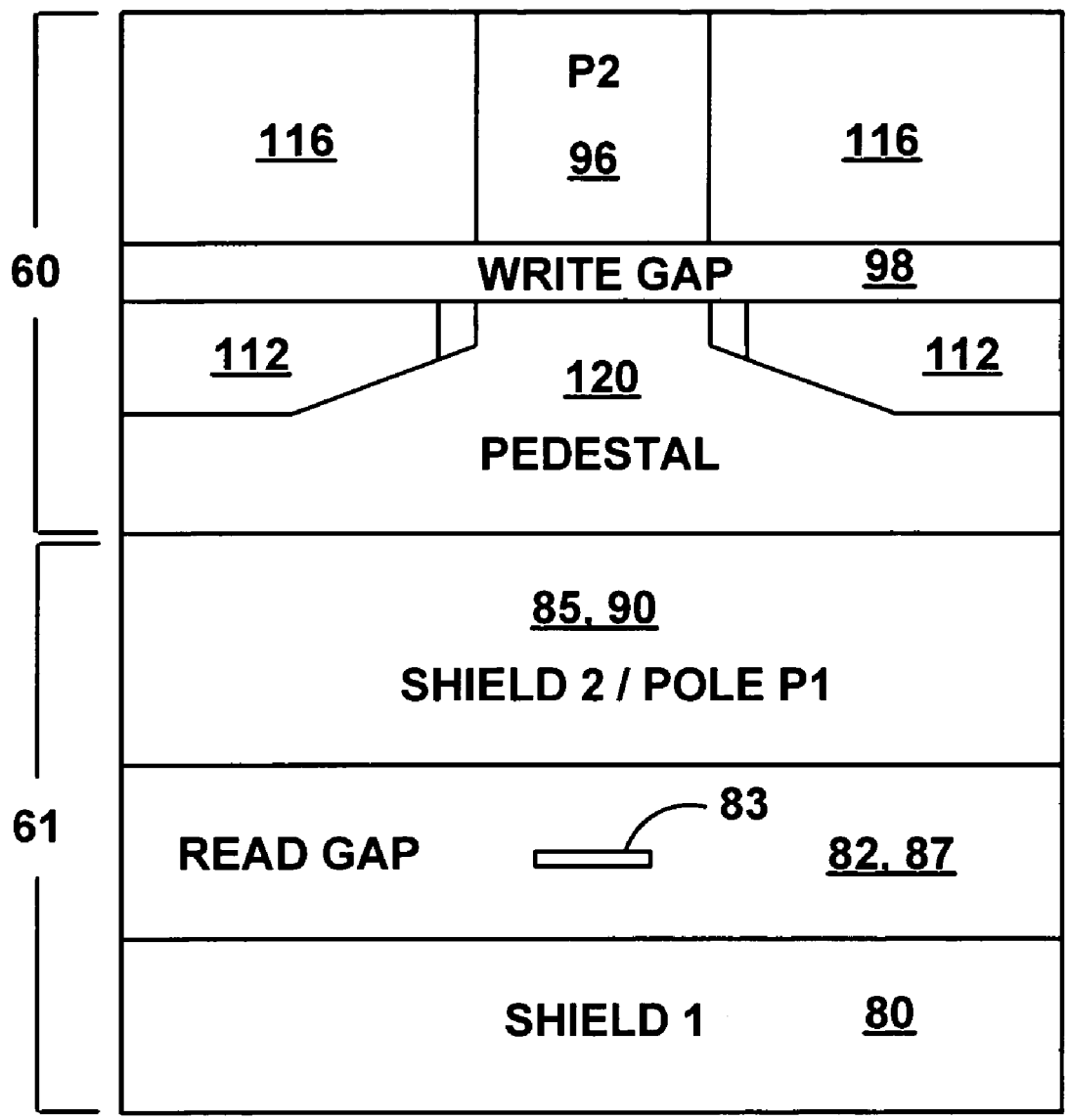
FIG. 8 is an ABS view of the read/write head of the present invention.

Having described the various sides of the platform 200, it can be said to be comprised of two sections: a forward section 300 and a rearward section 350 (FIG. 7E). The forward section 300 is defined by the forward face 140, the top face 250, and the two side walls 210 and 240. The forward section 300 has a generally rectangular cross-section along the plane of the top face 250.

The rearward section 350 (FIG. 7E) is defined by the two angled side walls 220, 230, the top face 250, and the back face 125. The rearward section, which is also referred to herein as a flared section, is generally trapezoidally shaped along the plane of the top face 250.

The rearward positioning of the flared section 350 relative to the ABS presents a significant feature of the present invention in that the flared section 350 diverts the magnetic flux leakage entering from the second pole layer 96 away from the pedestal region, thereby abating the magnetic saturation problem in the edge areas 145 and 150. The two angled side walls 220, 230 conform to (i.e., coplanar with the corresponding sides of) the flare 115 (FIG. 6B), in order to minimize the magnetic flux interference effect.

The pedestal structure 120 of the present invention and its location relative to the flare position 130 of the second pole layer 96 allows the magnetization to move back from the pole tip region of the write head 60, thereby reducing the concentration of the off-track field on the edge areas 145 and 150 while enhancing the on-track field.

It should be understood that the geometry, compositions, and dimensions of the elements described herein can be modified within the scope of the invention and are not intended to be the exclusive; rather, they can be modified within the scope of the invention. Other modifications can be made when implementing the invention for a particular environment.

What is claimed is:

1. A write head for use in a data storage system, comprising:
   a first pole layer, P1, made of magnetically soft material;
   a pedestal formed on the first pole layer, P1, that defines a zero throat that lies in a plane generally parallel to an air bearing surface (ABS);
   a second pole layer, P2, which defines a nose between the ABS and a flare position;
   wherein the pedestal extends to the zero throat; and
   wherein the flare position is closer to the air bearing surface than the zero throat.

2. The write head of claim 1, wherein the zero throat is defined by a zero throat height, ZTH;
   wherein the nose is defined by a nose length, NL; and
   wherein the nose length, NL, is less than half the zero throat height, ZTH.

3. The write head of claim 2, wherein the first pole layer, P1, extends from the air bearing surface to a back gap.

4. The write head of claim 3, wherein the pedestal extends from the air bearing surface to the zero throat.

5. The write head of claim 4, wherein the nose is defined by a nose length, NL that ranges between approximately 0.6 μm and approximately 1.3 μm.

6. The write head of claim 5, wherein the nose is further defined by a nose width, nw, which, in turn, defines a track width.

7. The write head of claim 6, wherein the pedestal is defined by a pedestal height, ph, that ranges between approximately 1.55 μm to approximately 3 μm.

8. The write head of claim 1, further including a write coil.

9. The write head of claim 8, wherein the write coil includes a plurality of multi-turn conductive coil elements to generate a desired write field.

10. The write head of claim 8, wherein the write coil is formed of multiple layers.

11. A read/write head for use in a data storage system, comprising:
    a read head; and
    a write head comprised of:
       a first pole layer, P1, made of magnetically soft material:
       a pedestal formed on the first pole layer, P1, that defines a zero throat that lies in a plane generally parallel to on air bearing surface (ABS);
       a second pole layer, P2, which defines a nose between the ABS and a flare position;
       wherein the pedestal extends to the zero throat; and
       wherein the flare position is closer to the air bearing surface than the zero throat.

12. The read/write head of claim 11, wherein the zero throat is defined by a zero throat height, ZTH;
    wherein the nose is defined by a nose length, NL; and
    wherein the nose length, NL is less than half the zero throat height, ZTH.

13. The read/write head of claim 12, wherein the first pole layer, P1, extends from the air bearing surface to a back gap.

14. The read/write head of claim 13, wherein the pedestal extends from the air bearing surface to the zero throat.

15. The read/write head of claim 14, wherein the nose is defined by a nose length, NL, that ranges between approximately 0.6 μm and approximately 1.3 μm.

16. The read/write head of claim 15, wherein the nose is further defined by a nose width, nw, which, in turn, defines a track width.

17. The read/write head of claim 16, wherein the pedestal is defined by a pedestal height, ph, that ranges between approximately 1.55 μm to approximately 3 μm.

18. The read/write head of claim 11, further including a write coil.

19. The read/write head of claim 18, wherein the write coil includes a plurality of multi-turn conductive coil elements to generate a desired write field.

20. The read/write head of claim 18, wherein the write coil is formed of multiple layers.

21. A data storage system, comprising:
    an arm;
    a slider secured to the arm; and
    a read/write head comprised of:
    a read head; and
    a write head comprised of:
       a first pole layer, P1, made of magnetically soft material;
       a pedestal formed on the first pole layer, P1, that defines a zero throat that lies in a plane generally parallel to on air bearing surface (ABS);
       a second pole layer, P2, which defines a nose between the ABS and a flare position;
    wherein the pedestal extends to the zero throat; and
    wherein the flare position is closer to the air bearing surface than the zero throat.

22. The data storage system of claim 21, wherein the zero throat is defined by a zero throat height, ZTH;
    wherein the nose is defined by a nose length, NL; and
    wherein the nose length, NL is less than half the zero throat height, ZTH.

23. The data storage system of claim 22, wherein the first pole layer, P1, extends from the air bearing surface to a back gap.

24. The data storage system of claim 23, wherein the pedestal extends from the air bearing surface to the zero throat.

25. The data storage system of claim 24, wherein the nose is defined by a nose length, NL, that ranges between approximately 0.6 μm and approximately 1.3 μm.

26. The data storage system of claim 25, wherein the nose is further defined by a nose width, nw, which, in turn, defines a track width.

27. The data storage system of claim 26, wherein the pedestal is defined by a pedestal height, ph, that ranges between approximately 1.55 μm to approximately 3 μm.

28. The data storage system of claim 21, further including a write coil.

29. The data storage system of claim 28, wherein the write coil includes a plurality of multi-turn conductive coil elements to generate a desired write field.

30. The data storage system of claim 28, wherein the write coil is formed of multiple layers.

* * * * *

UNITED STATES PATENT AND TRADEMARK OFFICE
CERTIFICATE OF CORRECTION

| | |
|---|---|
| PATENT NO. | : 7,349,179 B1 |
| APPLICATION NO. | : 09/907152 |
| DATED | : March 25, 2008 |
| INVENTOR(S) | : He et al. |

It is certified that error appears in the above-identified patent and that said Letters Patent is hereby corrected as shown below:

Column 7, Line 54: Before "air" please delete "on" and insert -- an -- therefore.

Column 8, Line 29: Before "air" please delete "on" and insert -- an -- therefore.

Signed and Sealed this

Sixteenth Day of March, 2010

David J. Kappos
*Director of the United States Patent and Trademark Office*